United States Patent
Jen et al.

(10) Patent No.: US 11,669,481 B2
(45) Date of Patent: Jun. 6, 2023

(54) ENABLING SYNC HEADER SUPPRESSION LATENCY OPTIMIZATION IN THE PRESENCE OF RETIMERS FOR SERIAL INTERCONNECT

(71) Applicant: Intel Corporation, Santa Clara, CA (US)

(72) Inventors: Michelle Jen, Mountain View, CA (US); Debendra Das Sharma, Saratoga, CA (US); Bruce Tennant, Hillsboro, OR (US); Prahladachar Jayaprakash Bharadwaj, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/559,002

(22) Filed: Dec. 22, 2021

(65) Prior Publication Data

US 2022/0114128 A1    Apr. 14, 2022

Related U.S. Application Data

(63) Continuation of application No. 16/554,974, filed on Aug. 29, 2019, now Pat. No. 11,232,058.

(60) Provisional application No. 62/815,572, filed on Mar. 8, 2019.

(51) Int. Cl.
| | | |
|---|---|---|
| G06F 13/40 | (2006.01) |
| H04L 69/16 | (2022.01) |
| G06F 1/3237 | (2019.01) |
| G06F 13/42 | (2006.01) |
| G06F 13/38 | (2006.01) |

(52) U.S. Cl.
CPC ........ *G06F 13/4068* (2013.01); *G06F 1/3237* (2013.01); *G06F 13/4291* (2013.01); *H04L 69/161* (2013.01); *G06F 13/385* (2013.01)

(58) Field of Classification Search
None
See application file for complete search history.

(56) References Cited

U.S. PATENT DOCUMENTS

| | | |
|---|---|---|
| 9,444,551 B2 | 9/2016 | Fang et al. |
| 9,953,001 B2 | 4/2018 | Edirisooriya et al. |
| 10,606,785 B2 | 3/2020 | Das Sharma et al. |

(Continued)

OTHER PUBLICATIONS

European Patent Office, Extended European Search Report dated May 3, 2022 in European Patent Application No. 22153072.8 (10 pages).

(Continued)

*Primary Examiner* — Henry Tsai
*Assistant Examiner* — Christopher A Bartels
(74) *Attorney, Agent, or Firm* — Trop, Pruner & Hu, P.C.

(57) ABSTRACT

Methods and apparatuses associated with a secure stream protocol for a serial interconnect are disclosed herein. In embodiments, an apparatus comprises a transmitter and a receiver. The transmitter and receiver are configured to transmit and receive transaction layer data packets through a link, the transaction layer data packets including indicators associated with transmission of order set transmitted after a predetermined number of data blocks, when the transmission is during a header suppression mode. Additional features and other embodiments are also disclosed.

20 Claims, 12 Drawing Sheets

(56) References Cited

U.S. PATENT DOCUMENTS

| | | |
|---|---|---|
| 10,699,447 B2 | 6/2020 | Dwivedi |
| 10,771,189 B2 | 9/2020 | Das Sharma et al. |
| 10,896,089 B2 | 1/2021 | Helmick et al. |
| 10,944,660 B2 | 3/2021 | Hurson et al. |
| 2018/0329855 A1 | 11/2018 | Das Sharma et al. |
| 2019/0004990 A1 | 1/2019 | Doren et al. |
| 2019/0007310 A1 | 1/2019 | Das Sharma et al. |
| 2019/0065426 A1 | 2/2019 | Das Sharma et al. |
| 2019/0243637 A1 | 8/2019 | Nachimuthu et al. |
| 2020/0061811 A1 | 2/2020 | Iqbal et al. |
| 2020/0082241 A1 | 3/2020 | Paillet et al. |
| 2020/0186414 A1 | 6/2020 | Das Sharma et al. |
| 2020/0327088 A1 | 10/2020 | Choudary et al. |
| 2021/0263879 A1* | 8/2021 | Li .................. G06F 13/423 |
| 2021/0297228 A1* | 9/2021 | Li .................. G06F 5/06 |
| 2022/0350698 A1* | 11/2022 | Iyer ................ H04L 1/0045 |
| 2023/0029026 A1* | 1/2023 | Guim Bernat ...... H04L 67/2866 |

OTHER PUBLICATIONS

Anonymous, "AR #21566: LogiCORE PCI Express—How often does the PCI Express Core insert a SKP ordered set?" Dec. 15, 2012, 2 pages total (www.xilinx.com/support/answers/21566.htmp).

European Patent Office, Communication and European Search Report dated Jun. 12, 2020 in European Patent Application No. 20 15 4757.7, 18 pages total.

European Patent Office, Office Action dated Aug. 2, 2021 in European Patent Application No. 20154757.7 (5 pages).

Intel Corporation, "Complete Express Link, Specification, Mar. 2019, Revision: 1.0" Mar. 2019. 206 pages.

Intel Corporation, "PCI Express (PCIe) 4.0 Retimer Supplemental Features and Standard BGA Footprint," Revision 004, 2018 54 pages.

Jason Lawley, "Understanding Performance of PCI Express Systems," Oct. 28, 2014, 16 pages.

European Patent Office, Communication Pursuant to Article 94(3) EPC dated Feb. 13, 2023 in European Patent Application No. 22153072.8 (6 pages).

* cited by examiner

|  | L0 | L1 | L2 | L3 |
|---|---|---|---|---|
| SYMBOL 0 | SDS ORDERED SET 108 | SDS ORDERED SET | SDS ORDERED SET | SDS ORDERED SET |
| SYMBOL1-SYMBOL 14 | | | | |
| SYMBOL 15 | | | | |
| SYMBOL 0 | PROTID[7:0] | PROTID[15:8] | FLIT[7:0] | FLIT[15:8] |
| SYMBOL 1 | FLIT[119:112] | FLIT[127:120] | FLIT[135:128] | FLIT[143:136] |
| SYMBOL 2 | FLIT[247:240] | FLIT[255:248] | FLIT[263:256] | FLIT[271:264] |
| SYMBOL 3 | FLIT[357:368] | FLIT[383:376] | FLIT[391:384] | FLIT[399:392] |
| SYMBOL 4 | FLIT[503:496] | FLIT[511:504] | FLIT[519:512] | FLIT[527:520] |
| SYMBOL 5 | FLIT[87:80] | FLIT[95:88] | FLIT[103:96] | FLIT[111:104] |
| SYMBOL 6 | FLIT[215:280] | FLIT[223:216] | FLIT[231:224] | FLIT[293:232] |
| SYMBOL 7 | FLIT[343:336] | FLIT[351:344] | FLIT[359:352] | FLIT[367:360] |
| SYMBOL 8 | FLIT[471:464] | FLIT[479:472] | FLIT[487:480] | FLIT[495:488] |
| SYMBOL 9 | FLIT[55:48] | FLIT[63:56] | FLIT[71:4] | FLIT[79:72] |
| SYMBOL 10 | FLIT[183:176] | FLIT[191:184] | FLIT[199:192] | FLIT[207:200] |
| SYMBOL 11 | FLIT[311:304] | FLIT[319:312] | FLIT[327:320] | FLIT[335:328] |
| ... | 102 | | | |
| SYMBOL 0 | CONTROL SKP OS OR SKP OS | CONTROL SKP OS OR SKP OS | CONTROL SKP OS OR SKP OS | CONTROL SKP OS OR SKP OS |
| SYMBOL1-SYMBOL 14 | | | | |
| SYMBOL 15 | | | | |
| ... | 104 | | | |
| SYMBOL 0 | CONTROL SKP OS OR SKP OS | CONTROL SKP OS OR SKP OS | CONTROL SKP OS OR SKP OS | CONTROL SKP OS OR SKP OS |
| SYMBOL1-SYMBOL 14 | | | | |
| SYMBOL 15 | | | | |

340 DATA BLOCKS 106A

340 DATA BLOCKS 106B

FIG. 1

| L4 | L5 | L6 | L7 | L8 | L9 |
|---|---|---|---|---|---|
| SDS ORDERED SET | SDS ORDERED SET 108 | SDS ORDERED SET | SDS ORDERED SET | SDS ORDERED SET | SDS ORDERED SET |
| FLIT[23:16] | FLIT[31:24] | FLIT[39:32] | FLIT[47:40] | FLIT[55:48] | FLIT[63:56] |
| FLIT[151:144] | FLIT[159:152] | FLIT[167:160] | FLIT[175:168] | FLIT[183:176] | FLIT[191:184] |
| FLIT[279:272] | FLIT[287:280] | FLIT[295:288] | FLIT[303:296] | FLIT[311:304] | FLIT[319:312] |
| FLIT[407:400] | FLIT[415:408] | FLIT[423:416] | FLIT[431:424] | FLIT[439:432] | FLIT[447:440] |
| PROTID[7:0] | PROT[15:8] | FLIT[7:0] | FLIT[15:8] | FLIT[23:16] | FLIT[31:24] |
| FLIT[119:112] | FLIT[127:120] | FLIT[135:128] | FLIT[143:136] | FLIT[151:144] | FLIT[159:152] |
| FLIT[247:240] | FLIT[255:248] | FLIT[263:256] | FLIT[271:264] | FLIT[279:272] | FLIT[287:280] |
| FLIT[375:368] | FLIT[383:376] | FLIT[391:384] | FLIT[399:392] | FLIT[407:400] | FLIT[415:408] |
| FLIT[503:496] | FLIT[511:504] | FLIT[519:512] | FLIT[527:520] | PROTID[7:0] | PROTID[15:8] |
| FLIT[87:80] | FLIT[95:88] | FLIT[103:96] | FLIT[111:104] | FLIT[119:112] | FLIT[127:120] |
| FLIT[215:208] | FLIT[223:216] | FLIT[231:224] | FLIT[239:232] | FLIT[247:240] | FLIT[255:248] |
| FLIT[343:336] | FLIT[351:344] | FLIT[359:352] | FLIT[367:360] | FLIT[375:368] | FLIT[383:376] |
| DATA STREAM 108 ||||||
| CONTROL SKP OS OR SKP OS | CONTROL SKP OS OR SKP OS | CONTROL SKP OS OR SKP OS | CONTROL SKP OS OR SKP OS | CONTROL SKP OS OR SKP OS | CONTROL SKP OS OR SKP OS |
| DATA STREAM ||||||
| CONTROL SKP OS OR SKP OS | CONTROL SKP OS OR SKP OS | CONTROL SKP OS OR SKP OS | CONTROL SKP OS OR SKP OS | CONTROL SKP OS OR SKP OS | CONTROL SKP OS OR SKP OS |

FIG. 1
(Continued)

| L10 | L11 | L12 | L13 | L14 | L15 |
|---|---|---|---|---|---|
| SDS ORDERED SET | SDS ORDERED SET | SDS ORDERED SET | SDS ORDERED SET | SDS ORDERED SET | SDS ORDERED SET |
| FLIT[71:4] | FLIT[79:72] | FLIT[87:80] | FLIT[95:88] | FLIT[103:96] | FLIT[111:104] |
| FLIT[199:192] | FLIT[207:200] | FLIT[215:208] | FLIT[223:216] | FLIT[231:224] | FLIT[239:232] |
| FLIT[327:320] | FLIT[335:328] | FLIT[343:336] | FLIT[351:344] | FLIT[359:352] | FLIT[367:360] |
| FLIT[455:448] | FLIT[463:456] | FLIT[471:464] | FLIT[479:472] | FLIT[487:480] | FLIT[495:488] |
| FLIT[39:32] | FLIT[47:40] | FLIT[55:48] | FLIT[63:56] | FLIT[71:4] | FLIT[79:72] |
| FLIT[167:160] | FLIT[175:168] | FLIT[183:176] | FLIT[191:184] | FLIT[199:192] | FLIT[207:200] |
| FLIT[295:288] | FLIT[303:296] | FLIT[311:304] | FLIT[319:312] | FLIT[327:320] | FLIT[335:328] |
| FLIT[423:416] | FLIT[431:424] | FLIT[439:432] | FLIT[447:440] | FLIT[445:448] | FLIT[463:456] |
| FLIT[7:0] | FLIT[15:8] | FLIT[23:16] | FLIT[31:24] | FLIT[39:32] | FLIT[47:40] |
| FLIT[135:128] | FLIT[143:136] | FLIT[151:144] | FLIT[159:152] | FLIT[167:160] | FLIT[175:168] |
| FLIT[263:256] | FLIT[271:264] | FLIT[279:272] | FLIT[287:280] | FLIT[295:288] | FLIT[303:296] |
| FLIT[391:384] | FLIT[399:392] | FLIT[407:400] | FLIT[415:408] | FLIT[423:416] | FLIT[431:424] |
| | | | | | |
| CONTROL SKP OS OR SKP OS | CONTROL SKP OS OR SKP OS | CONTROL SKP OS OR SKP OS | CONTROL SKP OS OR SKP OS | CONTROL SKP OS OR SKP OS | CONTROL SKP OS OR SKP OS |
| | | | | | |
| CONTROL SKP OS OR SKP OS | CONTROL SKP OS OR SKP OS | CONTROL SKP OS OR SKP OS | CONTROL SKP OS OR SKP OS | CONTROL SKP OS OR SKP OS | CONTROL SKP OS OR SKP OS |

FIG. 1
(Continued)

ENABLING SYNC HEADER SUPPRESSION LATENCY OPTIMIZATION IN THE PRESENCE OF RETIMERS FOR SERIAL INTERCONNECT

This application is a continuation of U.S. application Ser. No. 16/554,974, filed Aug. 29, 2019, which claims priority to U.S. Provisional Application No. 62/815,572, filed on Mar. 8, 2019, the content of which are hereby incorporated by reference.

TECHNICAL FIELD

Various embodiments generally may relate to the technical field of computing, and in particular, to enabling sync header suppression latency optimization in the presence of retimers for serial interconnect, such as Flex Bus technology for Intel Accelerator Link (Intel AL).

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Increasingly hardware accelerators are used, e.g., in data center applications, to accelerate execution performance. To meet the new performance demands, various complementary interconnect technology are being developed, e.g., Flex Bus technology enables Intel® Accelerator Link (Intel AL) protocols to be transported off-package using Peripheral Component Interconnect Express (PCIe) electricals. The memory and caching semantics that are part of the Intel AL protocol are used in latency sensitive applications. One of the latency optimizations defined to support Flex Bus.AL is PCIe sync header suppression. At 8 GT/s or higher data rates, there is normally a 2-bit sync header inserted before every 128 bit block transferred on every lane that is used to distinguish between PCIe data blocks and PCIe Ordered Set blocks. The multiple levels of muxing logic required to insert this sync header in the transmit path and to strip it out in the receive path is associated with significant latency that can be avoided by bypassing the use of sync headers altogether.

When PCIe sync headers are suppressed, each component on the link must still have a way of determining which blocks to decode as Ordered Set blocks so that link state transitions can be properly coordinated. Downstream and upstream port logic found in CPUs and endpoints can decode the data blocks to determine when a transition to an Ordered Set block is about to occur. On the other hand, retimers do not monitor the data blocks and thus need another way to identify the transitions from data blocks to Ordered Set blocks.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 1 illustrates Control SKP OS or SKP OS Insertion with Sync Header Suppressed.

DETAILED DESCRIPTION

Figure 2:
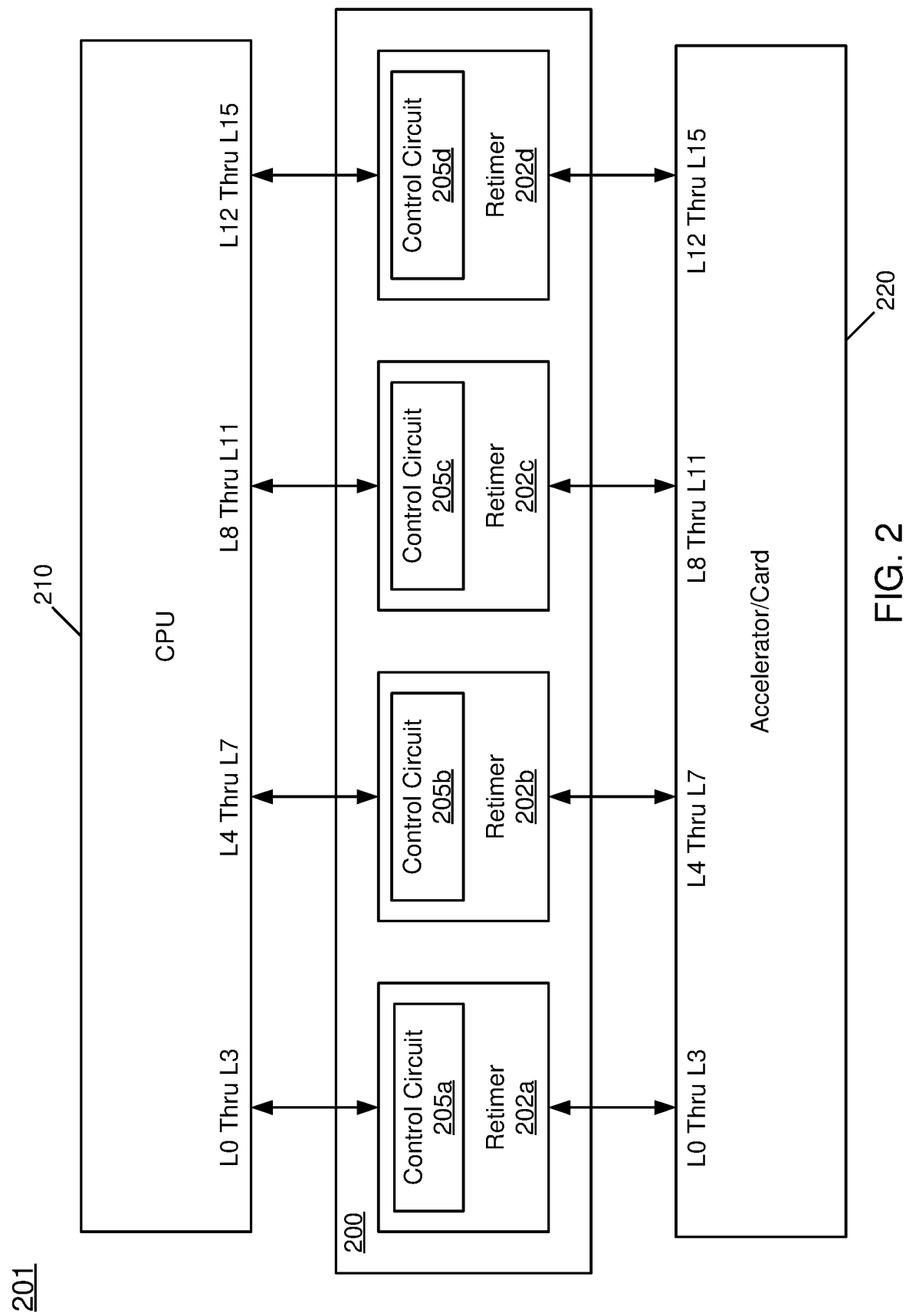
FIG. 2 illustrates Multiple Physical Retimers Configuration.

To address the challenge/problem described in the Background section, embodiments provide methods and apparatuses for allowing retimers to determine when PCIe Ordered Set blocks are being transmitted when in sync header suppression mode. Specifically, in embodiments, when in Flex Bus.AL mode, if sync headers are suppressed, the physical layer schedules insertion of a Control SKP Ordered Set or SKP Ordered Set after every 340 data blocks, unless it is exiting the data stream. Further, in embodiments, when exiting the data stream, the scheduled Control SKP OS (or SKP OS) is replaced with either an EIOS (for L1 entry) or EIEOS (for all other cases including recovery). This interval satisfies the PCIe clock tolerance compensation requirements for SKP OS insertion and ensures that insertion is done at Intel® AL 528-flit boundaries. With this mechanism in place, retimers are guaranteed that Ordered Set blocks are transmitted at fixed time slots and can thus decode them appropriately. This is so, in that retimers only decode ordered sets, and not regular data blocks. Understand that while this disclosure includes interconnect terminology including Flex Bus.AL or Intel® AL, these terms and interconnects according to such protocol are interchangeable with various Compute Express Link (CXL) interconnects in accordance with a Compute Express Link Specification, e.g., the Compute Express Link Specification Rev. 1.0 (March 2019) (hereafter CXL specification) or any future versions, modifications variations or alternatives to a CXL specification.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

Various operations will be described as multiple discrete operations, in turn, in a manner that is most helpful in understanding the illustrative embodiments; however, the order of description should not be construed as to imply that these operations are necessarily order dependent. In particular, these operations may not be performed in the order of presentation.

The phrase "in various embodiments," "in some embodiments," and the like are used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrases "A/B" and "A or B" mean (A), (B), or (A and B), similar to the phrase "A and/or B." For the purposes of the present disclosure, the phrase "at least one of A and B" means (A), (B), or (A and B). The description may use the phrases "in an embodiment," "in embodiments," "in some embodiments," and/or "in various embodiments," which may each refer to one or more of the same or different embodiments. Furthermore, the terms "comprising," "including," "having," and the like, as used with respect to embodiments of the present disclosure, are synonymous.

Example embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function.

Example embodiments may be described in the general context of computer-executable instructions, such as program code, software modules, and/or functional processes, being executed by one or more of the aforementioned circuitry. The program code, software modules, and/or functional processes may include routines, programs, objects, components, data structures, etc., that perform particular tasks or implement particular data types. The program code, software modules, and/or functional processes discussed herein may be implemented using existing hardware in existing communication networks. For example, program code, software modules, and/or functional processes discussed herein may be implemented using existing hardware at existing network elements or control nodes.

As used herein, the term "circuitry" refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (for example, a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality.

As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. As used herein, the term "interface circuitry" may refer to, is part of, or includes circuitry providing for the exchange of information between two or more components or devices. The term "interface circuitry" may refer to one or more hardware interfaces (for example, buses, input/output (I/O) interfaces, peripheral component interfaces, network interface cards, and/or the like). As used herein, the terms "instantiate," "instantiation," and the like may refer to the creation of an instance, and an "instance" may refer to a concrete occurrence of an object, which may occur, for example, during execution of program code.

As used herein, the term "computer device" may describe any physical hardware device capable of sequentially and automatically carrying out a sequence of arithmetic or logical operations, equipped to record/store data on a machine readable medium, and transmit and receive data from one or more other devices in a communications network. A computer device may be considered synonymous to, and may hereafter be occasionally referred to, as a computer, computing platform, computing device, etc. The term "computer system" may include any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources. As used herein, the term "user equipment" or "UE" may refer to a device, such as a computer device, with radio communication capabilities and may describe a remote user of network resources in a communications network. The term "user equipment" or "UE" may be considered synonymous to, and may hereafter be occasionally referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc.

Examples of "computer devices", "computer systems", "UEs", etc. may include cellular phones or smart phones, feature phones, tablet personal computers, wearable computing devices, an autonomous sensors, laptop computers, desktop personal computers, video game consoles, digital media players, handheld messaging devices, personal data assistants, an electronic book readers, augmented reality devices, server computer devices (e.g., stand-alone, rack-mounted, blade, etc.), cloud computing services/systems, network elements, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or any other like electronic devices. Moreover, the term "vehicle-embedded computer device" may refer to any computer device and/or computer system physically mounted on, built in, or otherwise embedded in a vehicle.

A computing system or a platform may use various devices coupled to a computer bus extensively. A computer bus may include related hardware components (wire, optical fiber, etc.) and software, including communication protocols. A peripheral component interconnect (PCI) bus or a PCI Express (PCIe, PCI-E) may be a computer bus based on a specification that provides a mechanism for system software, or a system driver, to perform various operations related to the configuration of a device coupled to the PCI bus or the PCIe bus. Devices, or components coupled to a computer bus may also be referred to as functions. PCIe may operate in consumer, server, and industrial applications, as a motherboard-level interconnect (to link motherboard-mounted peripherals), a passive backplane interconnect, and as an expansion card interface for add-in boards. PCIe devices communicate via a logical connection called an interconnect or link. A link is a point-to-point communication channel between two PCIe ports allowing both of them to send and receive ordinary PCI requests, e.g., configuration, input/output (I/O), or memory read/write, and interrupts. At the physical level, a link may be composed of one or more lanes. Low-speed peripherals, such as an 802.11 Wi-Fi card, use a single-lane (×1) link, while a graphics adapter typically uses a much wider and faster 16-lane link.

The present disclosure defines a relatively simple mechanism to enable retimers to identify Ordered Set blocks when sync headers are suppressed during transmission of data packets over a serial interconnect, e.g., during data packet transmission in the Flex Bus.AL latency-optimized mode when the 2-bit PCIe sync headers are suppressed. Before further describing the present disclosure, it should be noted, while for ease of understanding, the remaining description will be mainly presented in the context of Flex Bus.AL and PCIe, the present disclosure is not so limited, and may be practiced with other serial interconnects.

Unlike upstream and downstream ports found in CPUs and endpoints, retimers do not decode data blocks and thus cannot use tokens embedded in the data blocks to anticipate a transition to an Ordered Set block. Instead, the present disclosure provides that if sync header suppression is negotiated during the Flex Bus negotiation process, once a PCIe start of data stream (SDS) Ordered Set is transmitted to indicate the start of the data stream, the physical layer should schedule insertion of a Control skip (SKP) ordered set (OS) or a SKP OS 102 or 104 at a fixed interval of after every 340 data blocks 106a-106b as shown in FIG. 1.

With further reference to FIG. 1, which is an illustration of a data stream of transaction layer packets sent via a multi-lane link (namely an x16 link), to begin a data stream transmission first an SDS ordered set is sent across the lanes. In an embodiment, an ordered set block spans 128 bits per lane and is sent via a plurality of symbols (namely 16 symbols), where a symbol time is the amount of time is the amount of time to place a single byte onto a lane (which may be 10 bits due to 8B/10B encoding). Note that ordered sets may be used for training, entering and exiting electrical idle states, transitions to data blocks and clock tolerance compensation, or so forth.

As shown in FIG. 1, after communication of this SDS ordered set, a plurality of data blocks is sent. Note that data block transmission may be sent as a plurality of flits, with each flit including 528 bits. As shown, the flit payload is striped across the lanes on an 8-bit granularity. In turn, a protocol ID field is sent prior to a flit. Based upon the symbol time, this protocol ID field may start on different lanes, e.g., lane 0, lane 4, lane 8 or lane 12. Note that this protocol ID field may be used to specify the type of payload (such as the particular protocol used for the payload).

As shown in FIG. 1, after communication of 340 data blocks (illustrated at block 106a), an ordered set block 102 is sent across all lanes. Such transmission of this fixed number of data blocks followed by an ordered set may continue throughout the data stream communication, until a data stream is exited for L1 entry or recovery, at which point an electrical idle ordered set is inserted, rather than an SKP ordered set.

This interval was chosen for Flex Bus.AL to ensure that the 528-bit flits+16-bit protocol ID are able to complete transmission up to the flit boundary without being interrupted with a Control SKP OS/SKP OS insertion. There is no additional performance penalty for this insertion since SKP OS's are inserted for clock compensation purposes anyways as per the PCIe specification; embodiments enable the insertion points to be predictable. When exiting the data stream for L1 entry or recovery, the Control SKP OS/SKP OS slot is used for transmitting an EIOS (L1 entry) or EIEOS (recovery) as prescribed in the PCIe specification. Note, for SRIS clocking mode, the interval of insertion could be adjusted down to after every 34 data blocks. In other embodiments, other interval sizes may be used.

Referring now to FIG. 2, shown is a block diagram of a platform in accordance with an embodiment. As shown in FIG. 2, platform 201 may be any type of computing platform that includes a CPU 210 and an accelerator/card 220 such as a graphics or other specialized function accelerator. As shown, a retimer 200 may optionally be coupled between these components to extend a distance between CPU 210 and accelerator/card 220. With embodiments, retimer 200 may identify presence of ordered sets without decoding data packets themselves.

An additional benefit of this scheme is that it will also work for configurations where multiple physical retimers 202a-202d are used to form a single logical retimer 200 as shown in FIG. 2, with no additional communication required between the retimers. For instance, in alternate embodiments, if the transition to Ordered Set was indicated within the Protocol ID (108 in FIG. 1), not all of the retimers 202a-202d would see that indication and thus would require additional sideband communication among the retimers 202a-202d to broadcast the information.

As further shown in FIG. 2, each retimer 202 may include a corresponding control circuit 205a-205d to control processing of incoming packets and their further communication along to accelerator/card 220. Understand that in certain embodiments, control circuits 205 may be configured to identify the presence of ordered sets within a data stream in case of sync header suppression, and without decoding the data packets. For example, control circuits 205 may include one or more counters to count a number of received data packets since a SDS ordered set to identify when an ordered set is received according to a predetermined fixed interval. Then based on the content of such ordered set, control circuit 205 may simply reset the counter and continue forwarding received data packets (when the ordered set is a control SKP or SKP ordered set) or perform various power management operations when the received ordered set is some type of electrical idle ordered set.

Figure 3A:
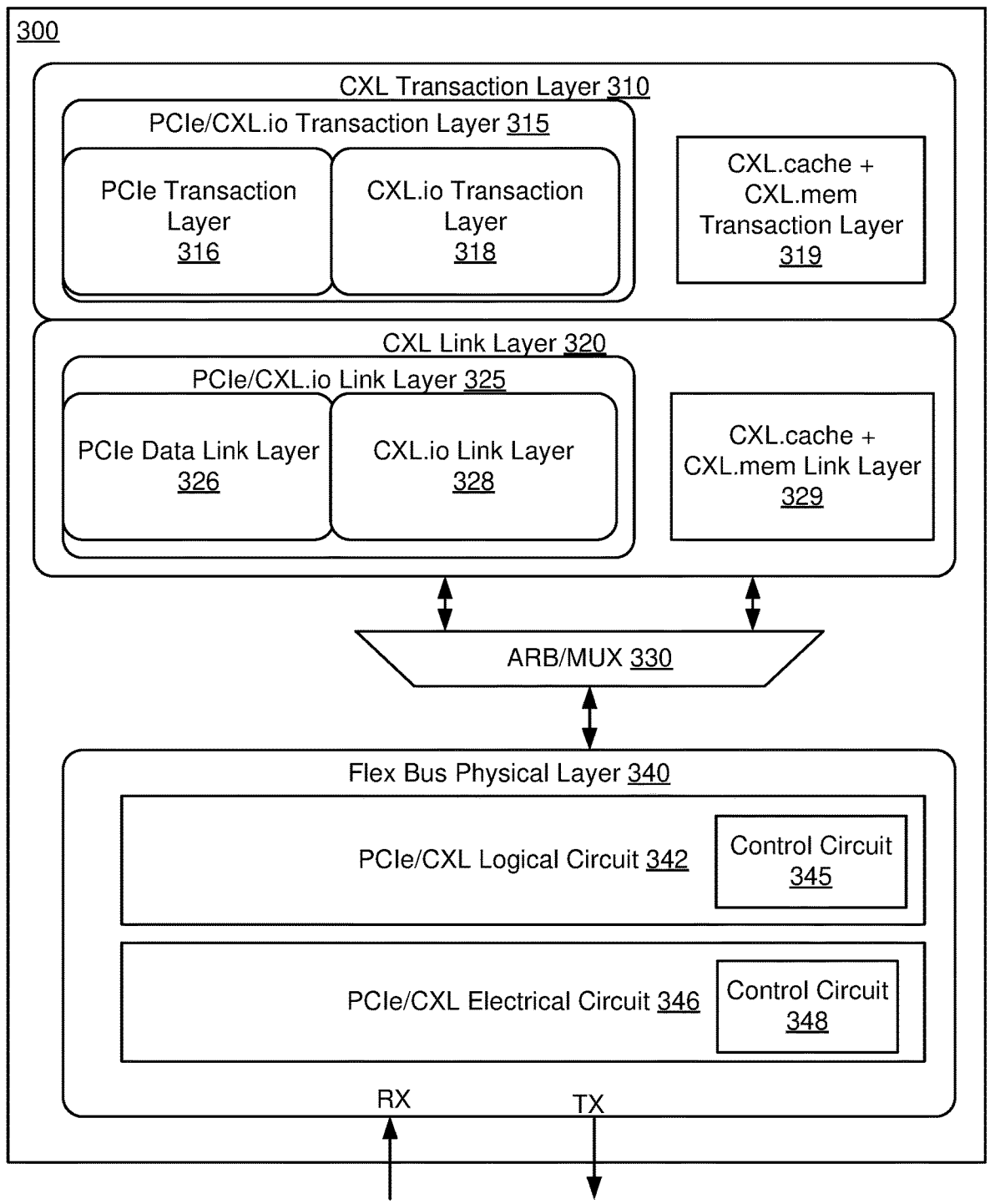
FIG. 3A is a block diagram of an interface circuit in accordance with an embodiment.

Referring now to FIG. 3A, shown is a block diagram of an interface circuit in accordance with an embodiment. More specifically as shown in FIG. 3A, interface circuit 300 is for interfacing a given device such as a transmitter and/or receiver to a link. In the embodiment shown in FIG. 3A, interface circuit 300 is a CXL interface circuit. As shown, CXL interface circuit 300 includes a transaction layer 310, a link layer 320, and a physical layer 340. With reference to CXL transaction layer 310, various components are included to enable transaction layer processing for PCIe/CXL.io communications and CXL.cache and CXL.memory transactions. More particularly, a PCIe/CXL.io transaction layer 315 includes a PCIe transaction layer 316 and additional circuitry 318 for handling enhancements to PCIe transaction layer 316 for handling CXL.io transactions. In turn, CXL.cache and CXL.memory transaction layer 319 may perform transaction layer processing for these protocols.

With reference to CXL link layer 320, various components are included to enable link layer processing for PCIe/CXL.io communications and CXL.cache and CXL.memory transactions. More particularly, a PCIe/CXL.io link layer 325 includes a PCIe data link layer 326 and additional circuitry 328 for handling enhancements to PCIe data link layer 326 for handling CXL.io transactions. In turn, CXL.cache and CXL.memory link layer 329 may perform link layer processing for these protocols.

With further reference to FIG. 3A, link layer 320 is coupled to an arbiter/multiplexer 330 that is to receive incoming data streams from link layer 320 and select a data stream (or portion thereof) for communication to a physical layer 340.

In an embodiment, physical layer 340 may be a physical layer to further process incoming data packets for communication on a physical link, which in an embodiment may be a flex bus. As illustrated, physical layer 340 includes a PCIe/CXL logical circuit 342 and a PCIe/CXL electrical circuit 346. As seen, these circuits include respective control circuits 345, 348 to control processing within physical layer 340. After all such processing is completed, outgoing transaction layer data packets may be communicated on the link. Similarly, incoming transaction layer data packets may be received within physical layer 340 and processed within the communication stack of interface circuit 300. Understand while shown at this high level in the embodiment of FIG. 3A, many variations and alternatives are possible.

Figure 3B:
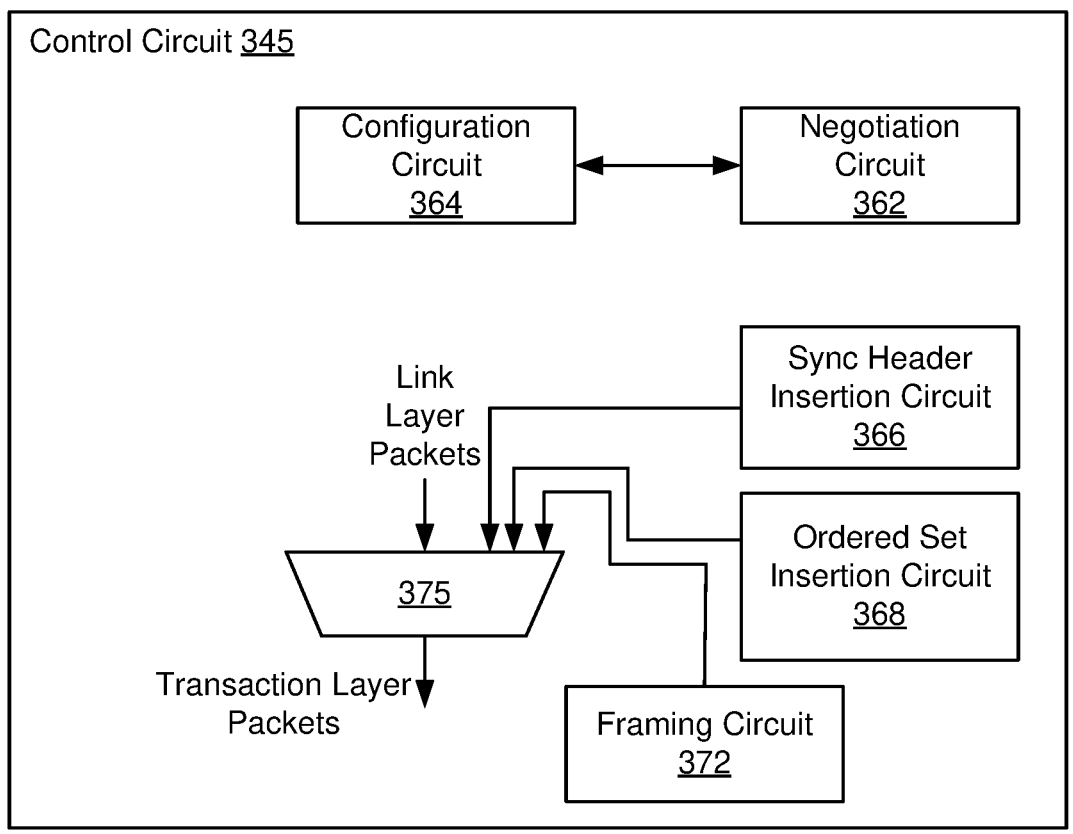
FIG. 3B is a more detailed block diagram of a control circuit for a physical layer in accordance with an embodiment.

Referring now to FIG. 3B, shown is a more detailed block diagram of a control circuit for a physical layer in accordance with an embodiment. As shown in FIG. 3B, control circuit 345 may be a control circuit included in a logical circuit of portion of the physical layer. As seen, control circuit 345 includes a negotiation circuit 362 which may perform link negotiation with a link partner based at least in part on capabilities of respective devices, modes of operation and so forth. In turn, negotiation circuit 362 may communicate with a configuration circuit 364. In turn, configuration circuit 364 may configure various components within the interface circuit.

With particular relation to sync header suppression operation, including predetermined ordered set insertion, control circuit 345 includes a sync header insertion circuit 366 and an ordered set insertion circuit 368. In various embodiments, insertion circuits 366, 368 may be configured to insert respective sync headers and ordered sets based on configuration and mode of operation. To this end, sync header insertion circuit 366 may include or may be coupled to a pattern storage that stores a sync header pattern. Similarly, ordered set header insertion circuit 368 may include or may be coupled to a pattern storage that stores ordered set patterns. Ordered set header insertion circuit 368 may further include one or more counters to identify when the predetermined number of data packets has been sent.

As further illustrated, control circuit 345 also includes a framing circuit 372 which may perform framing processing, including adding framing fields to transaction layer packets. In turn, incoming packets received from a link layer, along with various additional fields received from the circuits described herein may couple to a multiplexer circuit 375, which may selectively insert framing information, ordered set information, sync header information and so forth into the received link layer packets to output transaction layer packets. Understand while shown with this particular implementation in the embodiment of FIG. 3B, many variations and alternatives are possible.

Figure 4:
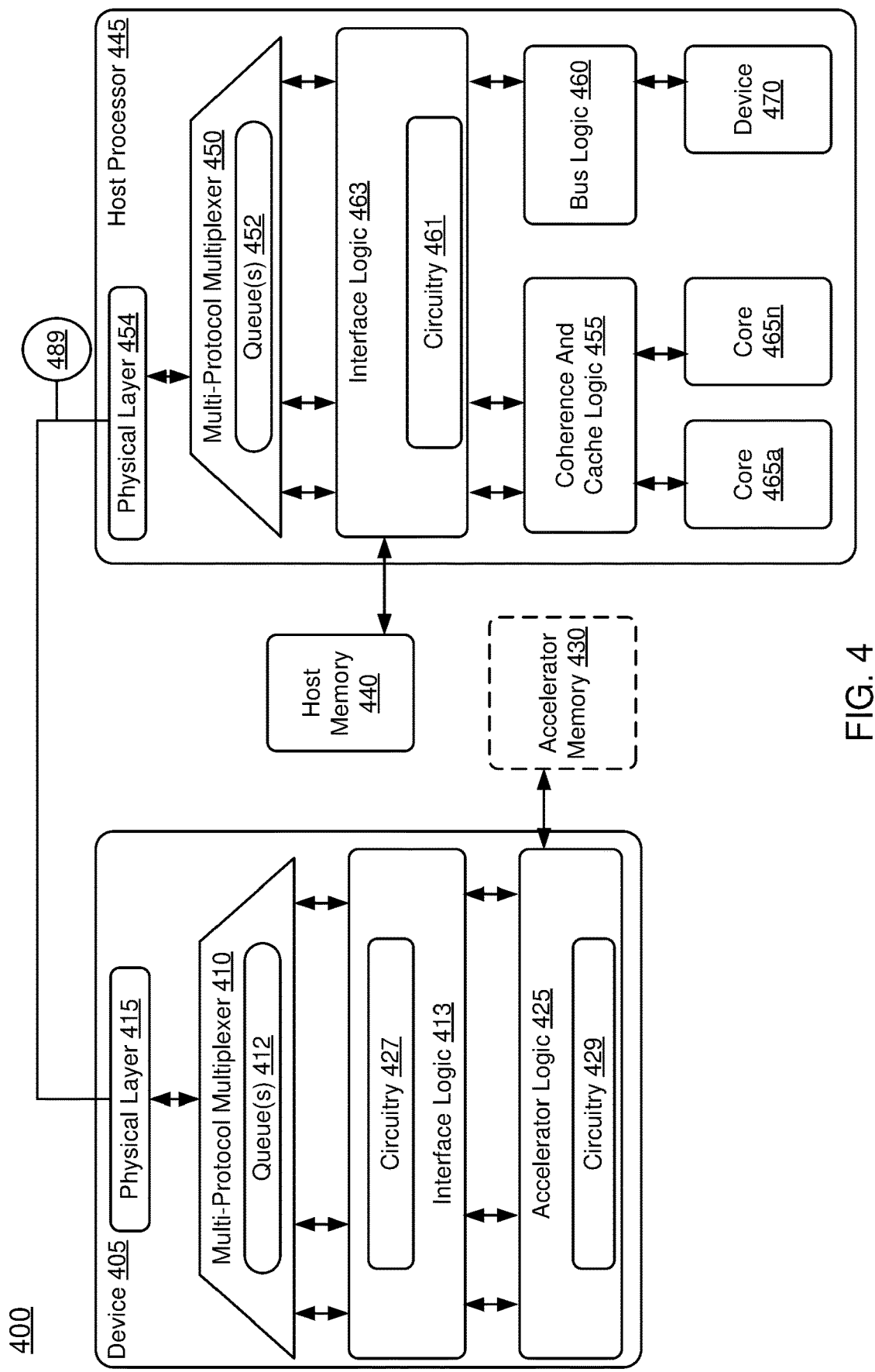
FIG. 4 is a block diagram of a system in accordance with an embodiment.

FIG. 4 is a block diagram of a system in accordance with an embodiment. As shown in FIG. 4 a device 405 may be an accelerator or processor device coupled to a host processor 445 via an interconnect 489, which may be single interconnect, bus, trace, and so forth. Device 405 and host processor 445 may communicate over link 489 to enable data and messages to pass therebetween. In some embodiments, link 489 may be operable to support multiple protocols and communication of data and messages via the multiple interconnect protocols, including a CXL protocol as described herein. For example, link 489 may support various interconnect protocols, including a non-coherent interconnect protocol, a coherent interconnect protocol, and a memory interconnect protocol. Non-limiting examples of supported interconnect protocols may include PCI, PCIe, USB, IDI, IOSF, SMI, SMI3, SATA, CXL.io, CXL.cache, and CXL.mem, and/or the like.

In embodiments, device 405 may include accelerator logic 425 including circuitry 429. In some instances, accelerator logic 425 and circuitry 429 may provide processing and memory capabilities. Examples of device 405 may include producer-consumer devices such as a graphics or other specialized accelerator, producer-consumer plus devices, software-assisted device memory devices, autonomous device memory devices, and giant cache devices. In some cases, accelerator logic 425 may couple to an optional accelerator memory 430. Accelerator logic 425 and circuitry 429 may provide the processing and memory capabilities based on the device. For example, accelerator logic 425 and circuitry 429 may communicate using, for example, a coherent interconnect protocol for various functions, such as coherent requests and memory flows with host processor 445 via interface logic 413 and circuitry 427. Interface logic 413 and circuitry 427 may determine an interconnect protocol based on the messages and data for communication. In some embodiments, interface logic 413 may be coupled to a multi-protocol multiplexer 410 having one or more protocol queues 412 to send and receive messages and data with host processor 445. Protocol queue 412 may be protocol specific such that each interconnect protocol may be associated with a particular protocol queue.

Multiplexer 410 may also implement arbitration circuitry to arbitrate between communications of different protocols and provide selected communications to a physical layer 415. In various embodiments, physical layer 415 may be configured to dynamically control insertion of ordered sets at predetermined intervals within a data stream, when operating in a sync header suppression mode.

In various embodiments, host processor 445 may be a main processor such as a CPU. Host processor 445 may be coupled to a host memory 440 and may include coherence logic (or coherence and cache logic) 455, which may include a cache hierarchy. Coherence logic 455 may communicate using various interconnects with interface logic 463 including circuitry 461 and one or more cores 465*a-n*. In some embodiments, coherence logic 455 may enable communication via one or more of a coherent interconnect protocol and a memory interconnect protocol.

In various embodiments, host processor 440 may include a device 470 to communicate with a bus logic 460 over an interconnect. In some embodiments, device 470 may be an I/O device, such as a PCIe I/O device. In other cases, one or more external devices such as PCIe devices may couple to bus logic 470.

In embodiments, host processor 445 may include interface logic 463 and circuitry 461 to enable multi-protocol communication between the components of host processor 445 and device 405. Interface logic 463 and circuitry 461 may process and enable communication of messages and data between host processor 445 and device 405 in accordance with one or more interconnect protocols, e.g., a non-coherent interconnect protocol, a coherent interconnect, protocol, and a memory interconnect protocol, dynamically. For example, interface logic 463 and circuitry 461 may determine a message type for each message and determine which interconnect protocol of a plurality of interconnect protocols to process each of the messages. Different interconnect protocols may be utilized to process the messages.

In some embodiments, interface logic 463 may be coupled to a multi-protocol multiplexer 450 having one or more protocol queues 452 to send and receive messages and data with device 405. Protocol queue 452 may be protocol specific such that each interconnect protocol may be associated with a particular protocol queue. Multiplexer 450 may also implement arbitration circuitry to arbitrate between communications of different protocols and provide selected communications to a physical layer 454. In various embodiments, physical layer 454 may be configured to dynamically control insertion of ordered sets at predetermined intervals within a data stream, when operating in a sync header suppression mode.

Figure 5:
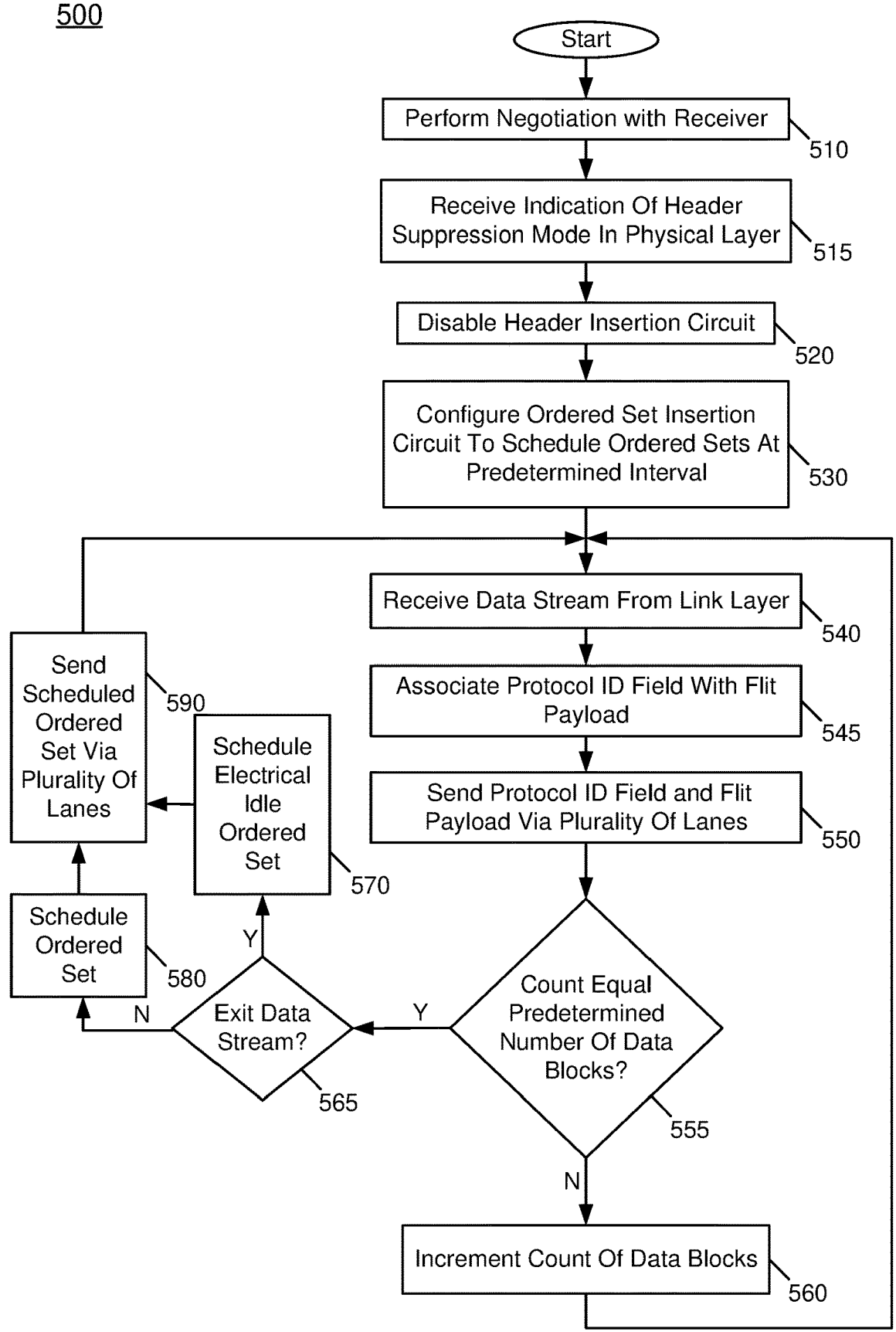
FIG. 5 is a flow diagram of a method in accordance with an embodiment of the present invention.

Referring now to FIG. 5, shown is a flow diagram of a method in accordance with an embodiment of the present invention. As shown in FIG. 5, method 500 is a method for configuring a physical layer of a transmitter to enable sync header suppression to communicate transaction layer packets without sync headers. In addition, method 500 also enables the physical layer to be configured to schedule ordered sets for communication at particular points in the data stream. In this way, downstream circuitry including one or more retimers can maintain timing information with respect to the data stream communication without decoding the data packets themselves. As such, method 500 may be performed by hardware circuitry, firmware, software and/or combinations thereof. In a particular embodiment, method 500 may be performed by circuitry present in a physical layer, such as logical physical layer circuitry of a transmitter.

As illustrated, method 500 begins by performing a negotiation with a receiver (block 510). As part of this negotiation, information regarding link characteristics, including link widths, latency requirements and so forth may be negotiated. Also as part of this negotiation, a header suppression mode may be enabled to reduce latency of communications. To this end, the physical layer may receive an indication of header mode suppression (block 515). In response to this indication, the physical layer may disable a header insertion circuit, which operates to insert sync headers within a data stream (block 520). Thereafter, control passes to block 530 where an ordered set insertion circuit may be configured. More specifically, this circuit may be configured to schedule ordered sets at a predetermined interval, e.g., after a predetermined number of data blocks. In a representative embodiment, this predetermined number may be 340 data blocks.

At this point, the physical layer is appropriately configured for operation in a header suppression mode and for communication of ordered sets as appropriate. As such, control passes to block 540 where an incoming data stream is received from a link layer. At block 545 a protocol ID field may be associated with a flit payload. Such flit payload in an embodiment may be 528-bits wide (512 bits of payload and 16 bits of cyclic rendundancy checksum). Next at block 550 the protocol ID field and the flit payload may be sent from the physical layer to a receiver coupled to the transmitter via a plurality of lanes. Understand that it is possible that a given interconnect may have a single serial link, although in more typical cases the serial link may be an x8 or an x16 link.

In any event, control passes to diamond 555 where it is determined whether a count of communicated data blocks equals a predetermined number of data blocks. In the particular embodiment here, this predetermined number data blocks may correspond to the predetermined interval, e.g., 340 data blocks. If this count has not been reached, the count of data blocks is incremented (block 560) and thereafter control passes back to block 540.

Otherwise when it is determined that the count reaches this predetermined number of data blocks, control passes to diamond 565. At diamond 565 it is determined whether the data stream is to be exited, such that transmitting components could be placed into a low power link state. If so, control passes to block 570 where an electrical idle ordered set may be scheduled. Thereafter, at block 590 this scheduled ordered set may be sent via the plurality of lanes. Understand at this point that the transmitter, or at least a portion thereof, may enter into an appropriate low power state. In this instance where an electrical idle ordered set is sent, indicating that the data stream is exiting the link may enter into a given low power state.

Still with reference to FIG. 5, instead if it is determined that the data stream is not to be exited, control passes to block 580 where an ordered set may be scheduled. More specifically, this ordered set may be a control SKP or SKP ordered set. To ensure that a retimer or other downstream circuitry can identify timing within a data stream, this ordered set can be scheduled to occur according to a predetermined fixed interval. Control next passes to block 590 where this scheduled ordered set is sent, as discussed above. Understand while shown at this high level in the embodiment of FIG. 5, many variations and alternatives are possible.

Figure 6:
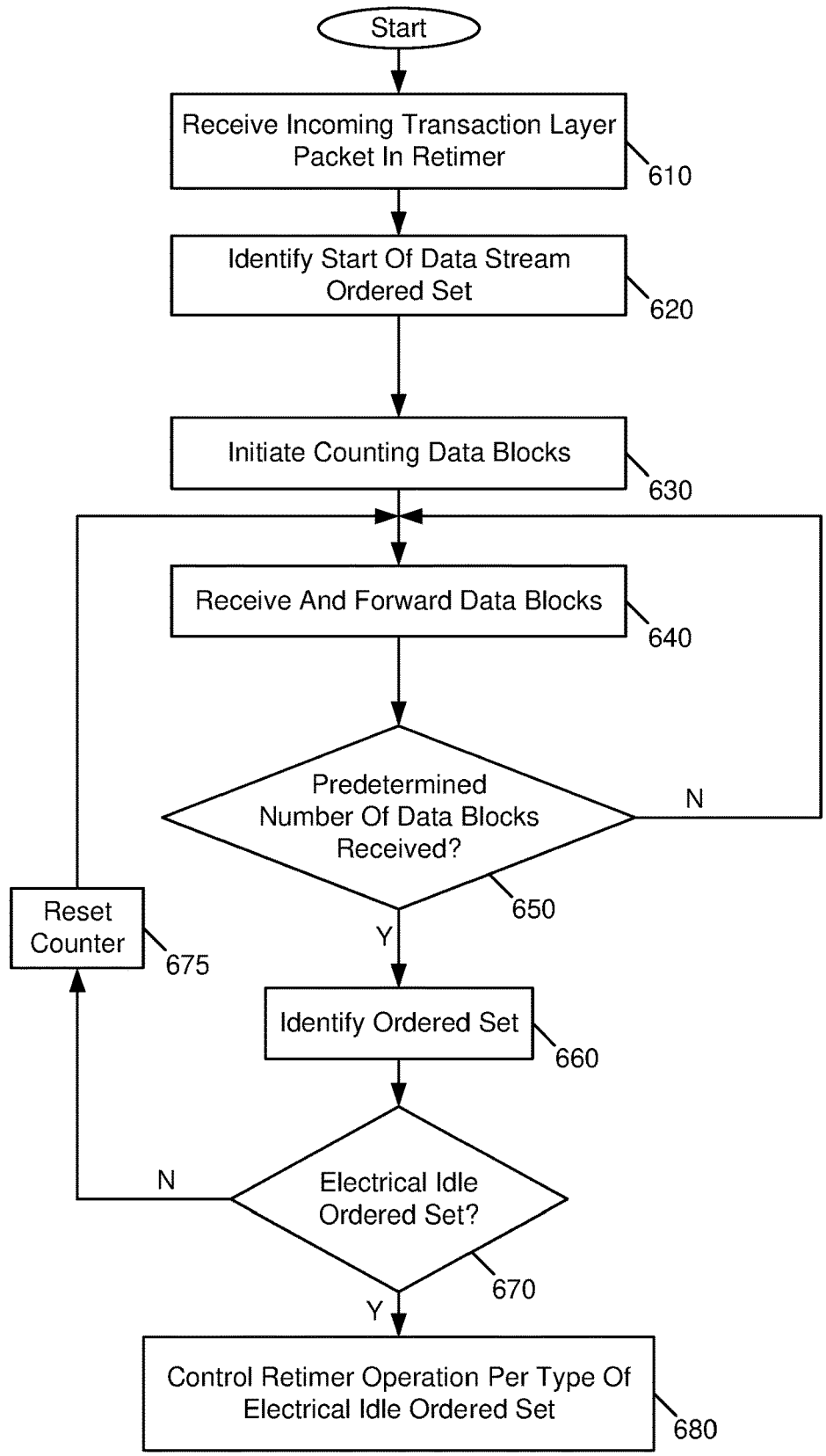
FIG. 6 is a flow diagram of a method in accordance with another embodiment of the present invention.

Referring now to FIG. 6, shown is a flow diagram of a method in accordance with another embodiment of the present invention. More specifically, method 600 is a method for processing data packets in a retimer. As such, method 600 may be performed by hardware circuitry, firmware, software and/or combinations thereof. In a particular embodiment, method 600 may be performed by circuitry present in a retimer.

As shown in FIG. 6, method 600 begins by receiving an incoming transaction layer packet in a retimer (block 610). Next at block 620 the retimer may identify a start of data stream ordered set that indicates a beginning of a data stream. In response to identification of this SDS ordered set, at block 630 the retimer may initiate counting of data blocks. As an example, a counter of the retimer may initiate a count of incoming data blocks in response to this identification of the SDS ordered set. As further incoming transaction layer packets are received, the count may be incremented accordingly (e.g., incremented by one per each transaction layer packet) and further the data blocks may be forwarded along to a downstream circuit, e.g., a receiver.

Next it may be determined at diamond 650 whether a predetermined number of data blocks has been received. In an embodiment herein, this predetermined number may correspond to 340 data blocks. If this number of received data blocks has yet to be received, control passes back to block 640 for further receipt, forwarding and counting of incoming data blocks. Instead when it is determined that the predetermined number of data blocks has been received, control passes to block 660 where an ordered set may be identified. This ordered set may be identified based at least in part on count and/or identification of a particular ordered set pattern that is received. From this identified ordered set it may be determined whether the ordered set is an electrical idle ordered set.

If not, the counter may be reset (block 675) and control passes back to block 630 where data blocks may be counted for a next set of (e.g., 340) data blocks. Otherwise if it is determined at diamond 670 that an electrical idle ordered set is received, control passes to block 680. At block 680, operation of the retimer may be controlled based on the type of electrical idle ordered set. For example, if it is an entry type of ordered set, the retimer may enter into an appropriate low power state. If it is a recovery ordered set, the retimer may exit from such low power state. Understand while shown at this high level in the embodiment of FIG. 6, many variations and alternatives are possible.

Figure 7:
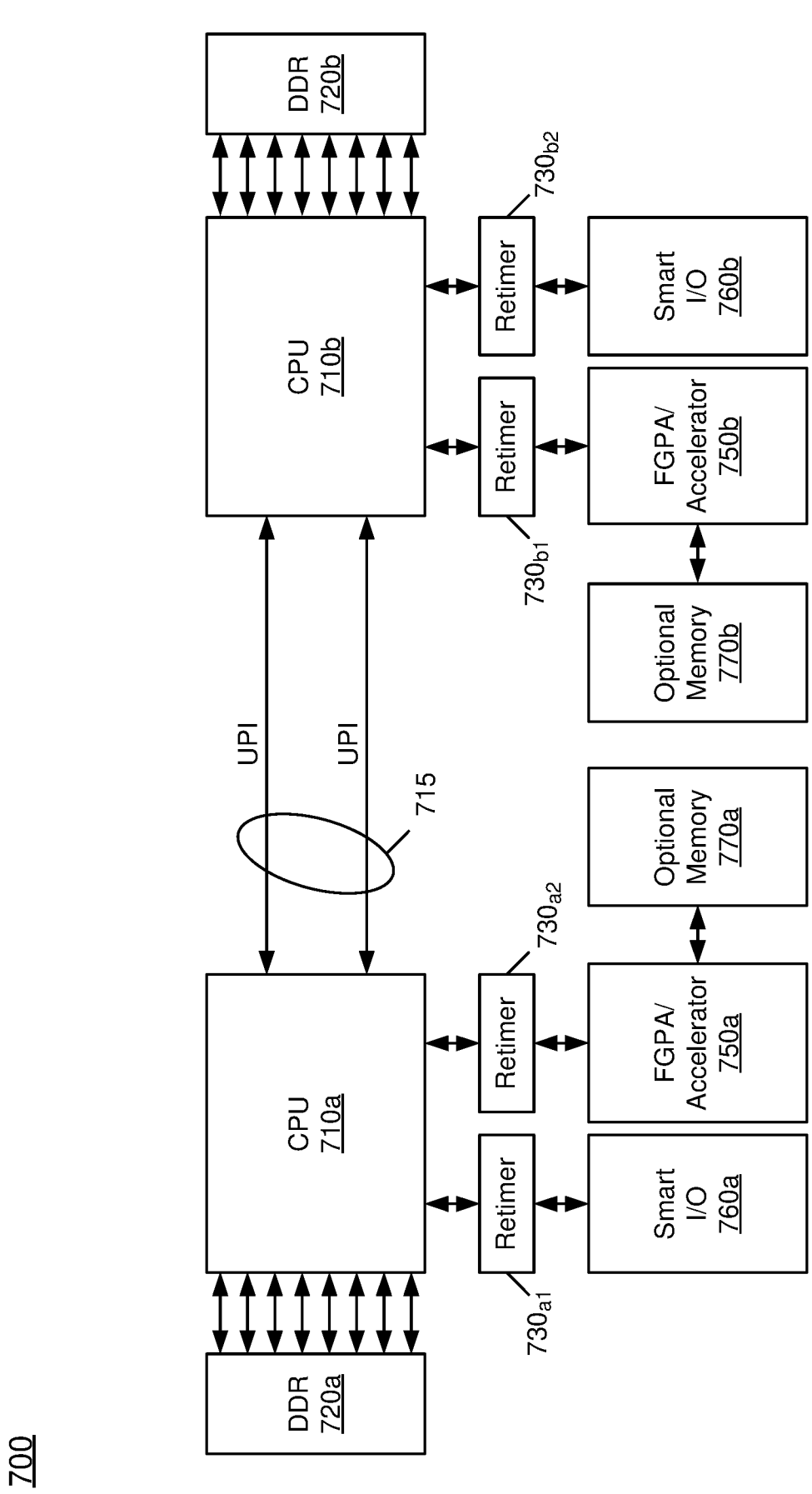
FIG. 7 is a block diagram of a system in accordance with another embodiment of the present invention.

Referring now to FIG. 7, shown is a block diagram of a system in accordance with another embodiment of the present invention. As shown in FIG. 7, a system 700 may be any type of computing device, and in one embodiment may be a server system. In the embodiment of FIG. 7, system 700 includes multiple CPUs $710_{a,b}$ that in turn couple to respective system memories $720_{a,b}$ which in embodiments may be implemented as double data rate (DDR) memory. Note that CPU 710 may couple together via an interconnect system 715 such as an Intel® Ultra Path Interconnect or other processor interconnect technology.

To enable coherent accelerator devices and/or smart input/output (IO) devices to couple to CPUs 710 by way of extended distances, a set of retimers $730_{a1-b2}$ may be present. Note that each retimer may be implemented as a single logical retimer that may include multiple independent physical retimers.

In the embodiment shown, retimers 730 couple respective CPU 710 to corresponding field programmable gate arrays (FPGAs)/accelerator devices $750_{a,b}$ and smart IO devices $760_{a,b}$. With embodiments herein that couple CPUs 710 to these devices via flex bus links, retimers 730 may identify ordered sets without decoding data communications using embodiments herein with fixed ordered set communication during sync header suppression mode. As further illustrated in FIG. 7, memories $770_{a,b}$ may optionally couple to FPGA/accelerator devices 750.

Figure 8:
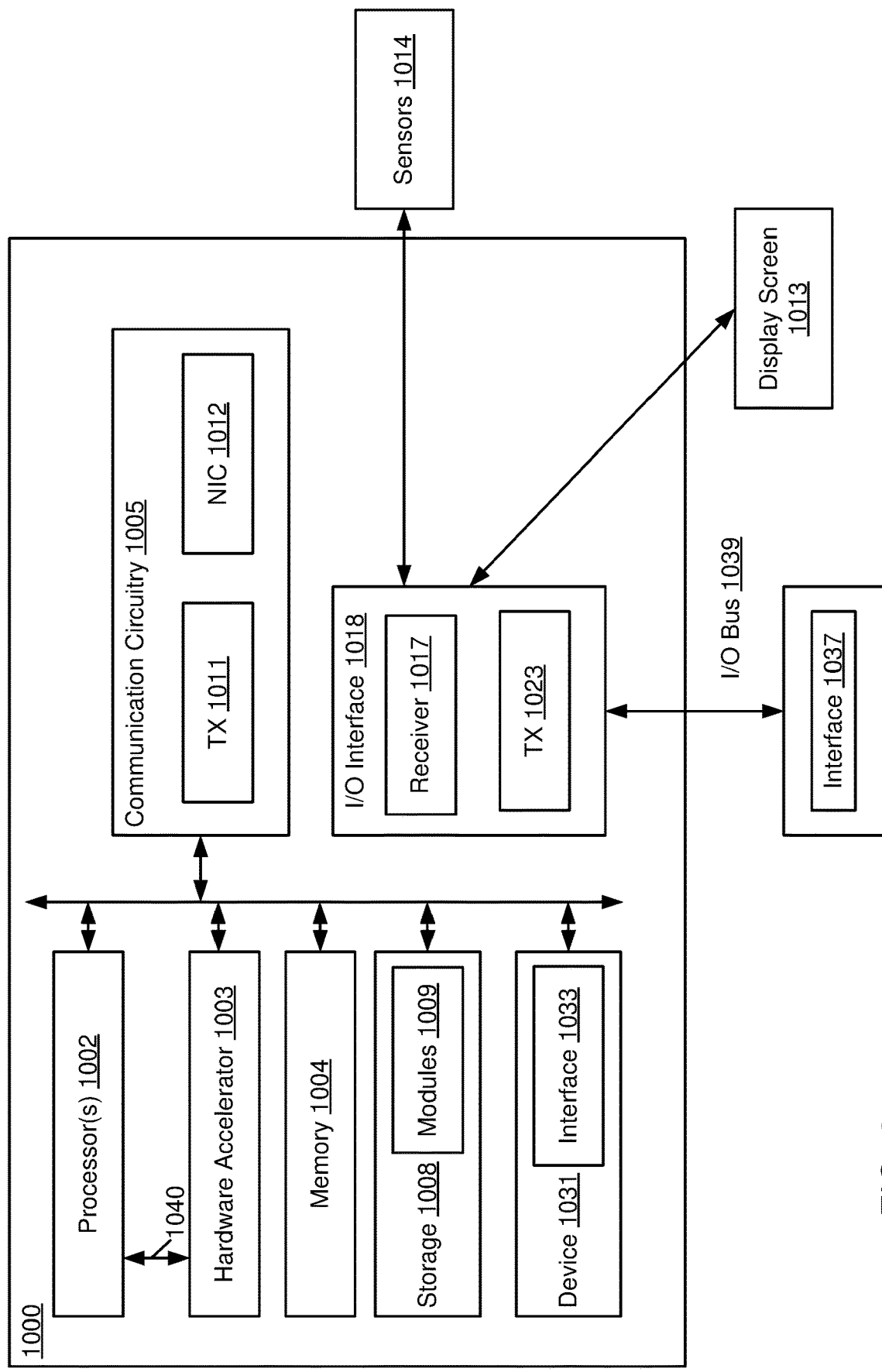
FIG. 8 illustrates an example device suitable for use to practice various aspects of the present disclosure, in accordance with various embodiments.

FIG. 8 illustrates an example device suitable for use to practice various programmatic aspects of the present disclosure, in accordance with various embodiments. The device 1000 may be used to implement programmatic aspects of the disclosed methodology. As shown, the device 1000 may include one or more processors 1002, each having one or more processor cores, or and optionally, a hardware accelerator 1003 (which may be an ASIC or a FPGA). In alternate embodiments, the hardware accelerator 1003 may be part of processor 1002, or integrated together on a SOC. Additionally, the device 1000 may include a memory 1004, which may be any one of a number of known persistent storage medium, and a data storage circuitry 1008 including modules 1009. In addition, the 1000 may include an I/O interface 1018, coupled to one or more sensors 1014, and a display screen 1013. The I/O interface 1018 may include a transmitter 1023 and a receiver 1017. Furthermore, the device 1000 may include communication circuitry 1005 including a transceiver (Tx) 1011, and network interface controller (NIC) 1012. The elements may be coupled to each other via system bus 1006, which may represent one or more buses, e.g., one or more PCIe buses. For various PCIe embodiments, communication circuitry 1005 and I/O interface 1018 may respectively include transmitter 1011 and NIC 1012, and transmitter 1023 and receiver 1017. In the case of multiple buses, they may be bridged by one or more bus bridges (not shown). A device 1031 may be coupled to the system bus 1006, and a device 1035 may be coupled to an I/O bus 1039. The device 1031 may include an interface 1033, and the device 1035 may include an interface 1037.

In embodiments, processor(s) 1002 and hardware accelerator 1003 may be additionally coupled with each other via a high speed serial interconnect, such as Intel® AL link. Further, processor(s) 1002 and hardware accelerator 1003 may be incorporated with the sync header suppression enabling technology of the present disclosure, to enable Intel® AL protocols to be transported off-package using PCIe electricals, as earlier described with references to FIGS. 1-8.

In embodiments, the processor(s) 1002 (also referred to as "processor circuitry 1002") may be one or more processing elements configured to perform basic arithmetical, logical, and input/output operations by carrying out instructions. Processor circuitry 1002 may be implemented as a stand-alone system/device/package or as part of an existing system/device/package. The processor circuitry 1002 may be one or more microprocessors, one or more single-core processors, one or more multi-core processors, one or more multithreaded processors, one or more GPUs, one or more ultra-low voltage processors, one or more embedded processors, one or more DSPs, one or more FPDs (hardware accelerators) such as FPGAs, structured ASICs, programmable SoCs (PSoCs), etc., and/or other processor or processing/controlling circuit. The processor circuitry 1002 may be a part of a SoC in which the processor circuitry 1002 and other components discussed herein are formed into a single IC or a single package. As examples, the processor circuitry 1002 may include one or more Intel Pentium®, Core®, Xeon®, Atom®, or Core M® processor(s); Advanced Micro Devices (AMD) Accelerated Processing Units (APUs), Epyc®, or Ryzen® processors; Apple Inc. A series, S series, W series, etc. processor(s); Qualcomm Snapdragon® processor(s); Samsung Exynos® processor(s); and/or the like.

In embodiments, the processor circuitry 1002 may include a sensor hub, which may act as a coprocessor by processing data obtained from the one or more sensors 1014. The sensor hub may include circuitry configured to integrate data obtained from each of the one or more sensors 1014 by performing arithmetical, logical, and input/output operations. In embodiments, the sensor hub may capable of timestamping obtained sensor data, providing sensor data to the processor circuitry 1002 in response to a query for such data, buffering sensor data, continuously streaming sensor data to the processor circuitry 1002 including independent streams for each sensor of the one or more sensors 1014, reporting sensor data based upon predefined thresholds or conditions/triggers, and/or other like data processing functions.

In embodiments, the memory 1004 (also referred to as "memory circuitry 1004" or the like) may be circuitry configured to store data or logic for operating the computer device 1000. The memory circuitry 1004 may include number of memory devices may be used to provide for a given amount of system memory. As examples, the memory circuitry 1004 can be any suitable type, number and/or combination of volatile memory devices (e.g., random access memory (RAM), dynamic RAM (DRAM), static RAM (SAM), etc.) and/or non-volatile memory devices (e.g., read-only memory (ROM), erasable programmable read-only memory (EPROM), electrically erasable programmable read-only memory (EEPROM), flash memory, anti-fuses, etc.) that may be configured in any suitable implementation as are known. In various implementations, individual memory devices may be formed of any number of different package types, such as single die package (SDP), dual die package (DDP) or quad die package, dual inline memory modules (DIMMs) such as microDIMMs or Mini-DIMMs, and/or any other like memory devices. To provide for persistent storage of information such as data, applications, operating systems and so forth, the memory circuitry 1004 may include one or more mass-storage devices, such as a solid state disk drive (SSDD); flash memory cards, such as SD cards, microSD cards, xD picture cards, and the like, and USB flash drives; on-die memory or registers associated with the processor circuitry 1002 (for example, in low power implementations); a micro hard disk drive (HDD); three dimensional cross-point (3D XPOINT) memories from Intel® and Micron®, etc.

Where FPDs are used, the processor circuitry 1002 and memory circuitry 1004 (and/or data storage circuitry 1008) may comprise logic blocks or logic fabric, memory cells, input/output (I/O) blocks, and other interconnected resources that may be programmed to perform various functions of the example embodiments discussed herein. The memory cells may be used to store data in lookup-tables (LUTs) that are used by the processor circuitry 1002 to implement various logic functions. The memory cells may include any combination of various levels of memory/storage including, but not limited to, EPROM, EEPROM, flash memory, SRAM, anti-fuses, etc.

In embodiments, the data storage circuitry 1008 (also referred to as "storage circuitry 1008" or the like), with shared or respective controllers, may provide for persistent storage of information such as modules 1009, operating systems, etc. The data storage circuitry 1008 may be implemented as solid state drives (SSDs); solid state disk drive (SSDD); serial AT attachment (SATA) storage devices (e.g., SATA SSDs); flash drives; flash memory cards, such as SD cards, microSD cards, xD picture cards, and the like, and USB flash drives; three-dimensional cross-point (3D Xpoint) memory devices; on-die memory or registers associated with the processor circuitry 1002; hard disk drives (HDDs); micro HDDs; resistance change memories; phase change memories; holographic memories; or chemical memories; among others. As shown, the data storage circuitry 1008 is included in the computer device 1000; however, in other embodiments, the data storage circuitry 1008 may be implemented as one or more devices separated from the other elements of computer device 1000.

In some embodiments, the data storage circuitry 1008 may include an operating system (OS) (not shown), which may be a general purpose operating system or an operating system specifically written for and tailored to the computer device 1000. The OS may include one or more drivers, libraries, and/or application programming interfaces (APIs), which provide program code and/or software components for modules 1009 and/or control system configurations to control and/or obtain/process data from the one or more sensors 1014.

The modules 1009 may be software modules/components used to perform various functions of the computer device 1000 and/or to carry out functions of the example embodiments discussed herein. In embodiments where the processor circuitry 1002 and memory circuitry 1004 includes hardware accelerators (e.g., FPGA cells, the hardware accelerator 1003) as well as processor cores, the hardware accelerators (e.g., the FPGA cells) may be pre-configured (e.g., with appropriate bit streams, logic blocks/fabric, etc.) with the logic to perform some functions of the embodiments herein (in lieu of employment of programming instructions to be executed by the processor core(s)). For example, the modules 1009 may comprise logic for the corresponding entities discussed with regard to the display screen 1013, the on-screen input device 1015, the on-screen input interface controller 1011, the off-screen input device 1021, the transmitter 1023, and the receiver 1017.

The components of computer device 1000 may communicate with one another over the system bus 1006. The system bus 1006 may include any number of technologies, such as a Local Interconnect Network (LIN); industry standard architecture (ISA); extended ISA (EISA); PCI; PCI extended (PCIx); PCIe; an Inter-Integrated Circuit (I2C) bus; a Parallel Small Computer System Interface (SPI) bus; Common Application Programming Interface (CAPI); point to point interfaces; a power bus; a proprietary bus, for example, Intel® Ultra Path Interface (UPI), Intel® Accelerator Link (IAL), or some other proprietary bus used in a SoC based interface; or any number of other technologies. In some embodiments, the system bus 1006 may be a controller area network (CAN) bus system, a Time-Trigger Protocol (TTP) system, or a FlexRay system, which may allow various devices (e.g., the one or more sensors 1014, etc.) to communicate with one another using messages or frames.

The communications circuitry 1005 may include circuitry for communicating with a wireless network or wired network. For example, the communication circuitry 1005 may include transceiver (Tx) 1011 and network interface controller (NIC) 1012. Communications circuitry 1005 may include one or more processors (e.g., baseband processors, modems, etc.) that are dedicated to a particular wireless communication protocol.

NIC 1012 may be included to provide a wired communication link to a network and/or other devices. The wired communication may provide an Ethernet connection, an Ethernet-over-USB, and/or the like, or may be based on other types of networks, such as DeviceNet, ControlNet, Data Highway+, PROFIBUS, or PROFINET, among many others. An additional NIC 1012 may be included to allow connect to a second network (not shown) or other devices, for example, a first NIC 1012 providing communications to the network 150 over Ethernet, and a second NIC 1012 providing communications to other devices over another type of network, such as a personal area network (PAN) including a personal computer (PC) device. In some embodiments, the various components of the device 1000, such as the one or more sensors 1014, etc. may be connected to the processor(s) 1002 via the NIC 1012 as discussed above rather than via the I/O circuitry 1018 as discussed infra.

The Tx 1011 may include one or more radios to wirelessly communicate with a network and/or other devices. The Tx 1011 may include hardware devices that enable communication with wired networks and/or other devices using modulated electromagnetic radiation through a solid or non-solid medium. Such hardware devices may include switches, filters, amplifiers, antenna elements, and the like to facilitate the communications over the air (OTA) by generating or otherwise producing radio waves to transmit data to one or more other devices, and converting received signals into usable information, such as digital data, which may be provided to one or more other components of computer device 1000. In some embodiments, the various components of the device 1000, such as the one or more sensors 1014, etc. may be connected to the device 1000 via the Tx 1011 as discussed above rather than via the I/O circuitry 1018 as discussed infra. In one example, the one or more sensors 1014 may be coupled with device 1000 via a short range communication protocol.

The Tx 1011 may include one or multiple radios that are compatible with any number of 3GPP (Third Generation Partnership Project) specifications, notably Long Term Evolution (LTE), Long Term Evolution-Advanced (LTE-A), Long Term Evolution-Advanced Pro (LTE-A Pro), and Fifth Generation (5G) New Radio (NR). It can be noted that radios compatible with any number of other fixed, mobile, or satellite communication technologies and standards may be selected. These may include, for example, any Cellular Wide Area radio communication technology, which may include e.g. a 5G communication systems, a Global System for Mobile Communications (GSM) radio communication technology, a General Packet Radio Service (GPRS) radio communication technology, or an Enhanced Data Rates for GSM Evolution (EDGE) radio communication technology. Other Third Generation Partnership Project (3GPP) radio communication technology that may be used includes UMTS (Universal Mobile Telecommunications System), FOMA (Freedom of Multimedia Access), 3GPP LTE (Long Term Evolution), 3GPP LTE Advanced (Long Term Evolution Advanced), 3GPP LTE Advanced Pro (Long Term Evolution Advanced Pro)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System-Time-Division Duplex), TD-CDMA (Time Division-Code Division Multiple Access), TD-SCDMA (Time Division-Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.11ad, IEEE 802.11ay, and the like. In addition to the standards listed above, any number of satellite uplink technologies may be used for the uplink transceiver, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated. Implementations, components, and details of the aforementioned protocols may be those known in the art and are omitted herein for the sake of brevity.

The input/output (I/O) interface 1018 may include circuitry, such as an external expansion bus (e.g., Universal Serial Bus (USB), FireWire, Thunderbolt, PCI/PCIe/PCIx, etc.), used to connect computer device 1000 with external components/devices, such as one or more sensors 1014, etc. I/O interface circuitry 1018 may include any suitable interface controllers and connectors to interconnect one or more of the processor circuitry 1002, memory circuitry 1004, data storage circuitry 1008, communication circuitry 1005, and the other components of computer device 1000. The interface controllers may include, but are not limited to, memory controllers, storage controllers (e.g., redundant array of independent disk (RAID) controllers, baseboard management controllers (BMCs), input/output controllers, host controllers, etc. The connectors may include, for example, busses (e.g., bus 1006), ports, slots, jumpers, interconnect modules, receptacles, modular connectors, etc. The I/O circuitry 1018 may couple the device 1000 with the one or more sensors 1014, etc. via a wired connection, such as using USB, FireWire, Thunderbolt, RCA, a video graphics array (VGA), a digital visual interface (DVI) and/or mini-DVI, a high-definition multimedia interface (HDMI), an S-Video, and/or the like.

The one or more sensors 1014 may be any device configured to detect events or environmental changes, convert the detected events into electrical signals and/or digital data, and transmit/send the signals/data to the computer device

1000. Some of the one or more sensors 1014 may be sensors used for providing computer-generated sensory inputs. Some of the one or more sensors 1014 may be sensors used for motion and/or object detection. Examples of such one or more sensors 1014 may include, inter alia, charged-coupled devices (CCD), Complementary metal-oxide-semiconductor (CMOS) active pixel sensors (APS), lens-less image capture devices/cameras, thermographic (infrared) cameras, Light Imaging Detection And Ranging (LIDAR) systems, and/or the like. In some implementations, the one or more sensors 1014 may include a lens-less image capture mechanism comprising an array of aperture elements, wherein light passing through the array of aperture elements define the pixels of an image. In embodiments, the motion detection one or more sensors 1014 may be coupled with or associated with light generating devices, for example, one or more infrared projectors to project a grid of infrared light onto a scene, where an infrared camera may record reflected infrared light to compute depth information.

Some of the one or more sensors 1014 may be used for position and/or orientation detection, ambient/environmental condition detection, and the like. Examples of such one or more sensors 1014 may include, inter alia, microelectromechanical systems (MEMS) with piezoelectric, piezoresistive and/or capacitive components, which may be used to determine environmental conditions or location information related to the computer device 1000. In embodiments, the MEMS may include 3-axis accelerometers, 3-axis gyroscopes, and/or magnetometers. In some embodiments, the one or more sensors 1014 may also include one or more gravimeters, altimeters, barometers, proximity sensors (e.g., infrared radiation detector(s) and the like), depth sensors, ambient light sensors, thermal sensors (thermometers), ultrasonic transceivers, and/or the like. Each of these elements, e.g., one or more processors 1002, the hardware accelerator 1003, the memory 1004, the data storage circuitry 1008 including the modules 1009, the input/output interface 1018, the one or more sensors 1014, the communication circuitry 1005 including the Tx 1011, the NIC 1012, the system bus 1006, the I/O bus 1039, the device 1031, the device 1035, may perform its conventional functions known in the art. In addition, they may be employed to store and host execution of programming instructions implementing various operating system functions and/or applications, in particular, operations associated with the sync header suppression enabling technology of the present disclosure, as earlier described with references to FIGS. 1-8.

The various elements may be implemented by assembler instructions supported by processor(s) 1002 or high-level languages, such as, for example, C, that can be compiled into such instructions. Operations associated with the device 1000 not implemented in software may be implemented in hardware, e.g., via hardware accelerator 1003.

The number, capability and/or capacity of these elements 1002-1039 may vary, depending on the number of other devices the device 1000 is configured to support. Otherwise, the constitutions of elements 1002-1039 are known, and accordingly will not be further described.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module," or "system."

Figure 9:
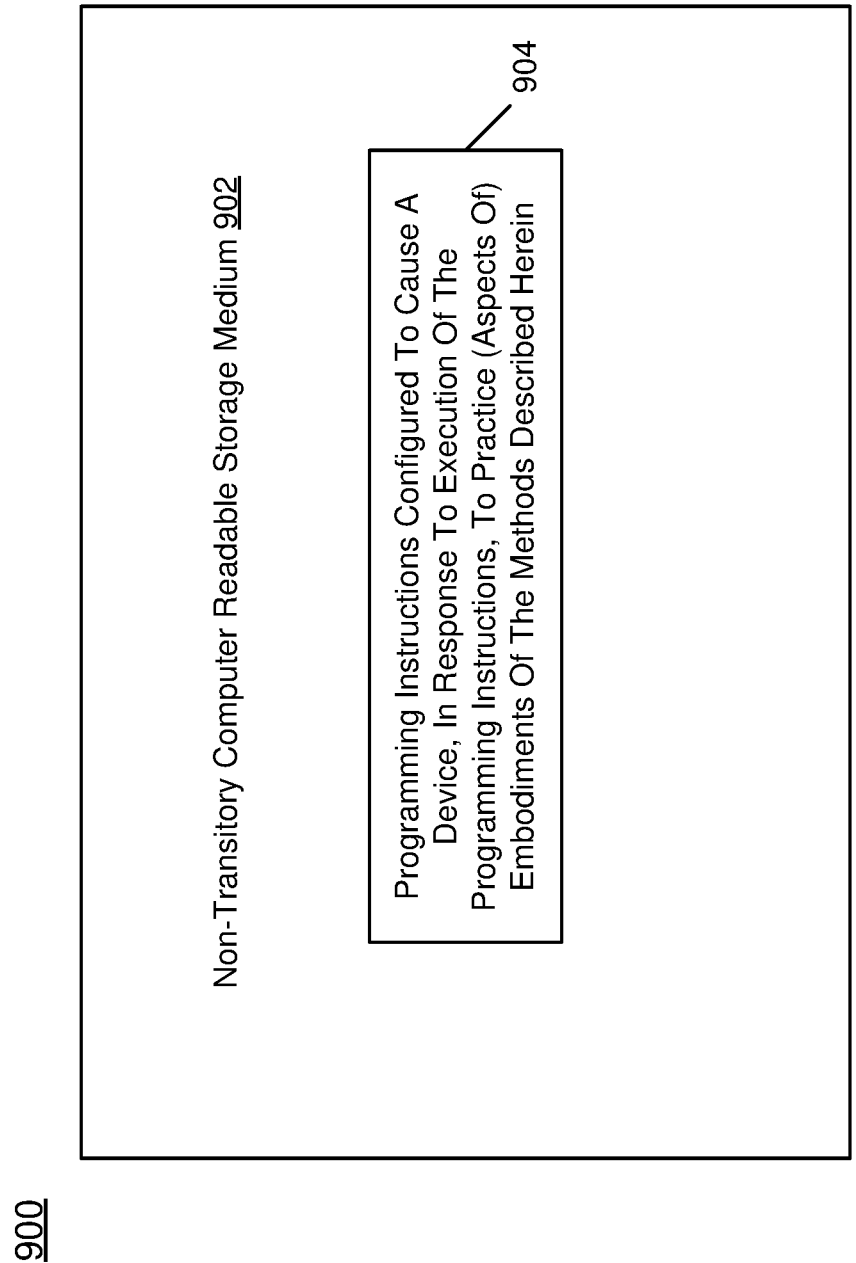
FIG. 9 illustrates a storage medium having instructions for practicing methods described with references to FIGS. 1-8, in accordance with various embodiments.

Furthermore, the present disclosure may take the form of a computer program product embodied in any tangible or non-transitory medium of expression having computer-usable program code embodied in the medium. FIG. 9 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 1102 may include a number of programming instructions 1104. Programming instructions 1104 may be configured to enable a device, e.g., device 1000, in response to execution of the programming instructions, to perform, e.g., various programming operations associated with operating system functions and/or applications, in particular, operations associated with the sync header suppression enabling technology of the present disclosure, as earlier described with references to FIGS. 1-8.

In alternate embodiments, programming instructions 1104 may be disposed on multiple computer-readable non-transitory storage media 1102 instead. In alternate embodiments, programming instructions 1104 may be disposed on computer-readable transitory storage media 1102, such as, signals. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment are chosen and described in order to best explain the principles of the disclosure and the practical application, and to enable others of ordinary skill in the art to understand the disclosure for embodiments with various modifications as are suited to the particular use contemplated.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

The following examples pertain to further embodiments.

In one example, an apparatus includes a transmitter comprising a physical layer configured to transmit a plurality of transaction layer data packets onto a serial interconnect, where the physical layer is to insert an ordered set after a predetermined number of data blocks of the plurality of transaction layer data packets, when the transmission is during a header suppression mode.

In an example, the serial interconnect comprises a Compute Express Link interconnect link.

In an example, the ordered set comprises one of a Control SKP ordered set or a SKP ordered set.

In an example, the predetermined number of data blocks is 340 data blocks.

In an example, the apparatus further comprises a plurality of physical retimers coupled to the transmitter via the serial interconnect, where the plurality of physical retimers are combined to form one logical retimer and the plurality of physical retimers comprises control circuitry to identify the ordered set without decoding the plurality of transaction layer data packets.

In an example, at least one of the plurality of physical retimers is to enter into a low power state when the ordered set is an electrical idle ordered set.

In an example, the physical layer comprises a control circuit, the control circuit comprising: a negotiation circuit to perform a negotiation with a link partner, the negotiation comprising negotiation of the header suppression mode; and a configuration circuit to disable a sync header insertion circuit in the header suppression mode.

In an example, during the negotiation, a retimer is to indicate support of the header suppression mode.

In an example, the control circuit further comprises an ordered set insertion circuit to insert the ordered set after the predetermined number of data blocks, the ordered set insertion circuit comprising at least one counter to count the predetermined number of data blocks.

In an example, the ordered set insertion circuit is to insert an electrical idle ordered set when a data stream comprising the plurality of transaction layer packets is to be exited.

In an example, the physical layer comprises a multiplexer to transmit the ordered set after the predetermined number of data blocks.

In another example, a method comprises: performing a negotiation between a transmitter and a receiver coupled to the transmitter via a link; disabling a header insertion circuit of a physical layer of the transmitter in response to negotiation of a header suppression mode, and configuring an ordered set insertion circuit of the physical layer to schedule ordered set insertion at a predetermined interval; and transmitting a plurality of transaction layer data packets from the physical layer to the receiver via the link, comprising transmitting an ordered set after a predetermined number of data blocks of the plurality of transaction layer data packets.

In an example, the method further comprises maintaining a count of data blocks transmitted from the physical layer.

In an example, the method further comprises transmitting the ordered set when the count equals the predetermined number of data blocks corresponding to the predetermined interval.

In an example, the method further comprises negotiating the header suppression mode in response to an indication from one or more retimers regarding support for the header suppression mode.

In another example, a computer readable medium including instructions is to perform the method of any of the above examples.

In a further example, a computer readable medium including data is to be used by at least one machine to fabricate at least one integrated circuit to perform the method of any one of the above examples.

In a still further example, an apparatus comprises means for performing the method of any one of the above examples.

In yet another example, a system comprises: a central processing unit having a transmitter; an accelerator having a receiver and coupled to the central processing unit via a link; and at least one retimer coupled between the central processing unit and the accelerator, where the retimer is to identify, in a data stream, an ordered set based on a fixed interval following receipt of a start of data stream ordered set, when the link is in operation in a header suppression mode.

In an example, the transmitter comprises a physical layer configured to transmit a plurality of transaction layer data packets onto the link, where the physical layer is to insert the ordered set after a predetermined number of data blocks.

In an example, the physical layer comprises: a negotiation circuit to perform a negotiation with the accelerator, the negotiation comprising negotiation of the header suppression mode; and a configuration circuit to disable a sync header insertion circuit in the header suppression mode.

In an example, the physical layer further comprises an ordered set insertion circuit to insert an electrical idle ordered set when a data stream comprising the plurality of transaction layer packets is to be exited.

In an example, the retimer comprises a plurality of physical retimers, the plurality of physical retimers combined to form one logical retimer and the plurality of physical retimers comprises control circuitry to identify the ordered set without decoding data packets of the data stream.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a multi-protocol multiplexer to receive at least one of first information of a first interconnect protocol or second information of a second interconnect protocol, the multi-protocol multiplexer to direct the at least one of the first information or the second information to a physical layer; and
the physical layer coupled to the multi-protocol multiplexer, wherein the physical layer is to receive the first information of the first interconnect protocol and transmit a packet on a plurality of lanes of a serial interconnect, the packet comprising a protocol ID and payload information comprising a plurality of flits,
wherein the physical layer is to:
send the protocol ID in 8-bit chunks on two consecutive lanes of the plurality of lanes, wherein the protocol ID is to be sent prior to each of the plurality of flits;
send the plurality of flits on the plurality of lanes; and
send an ordered set after a predetermined number of data blocks, during a mode in which sync headers are suppressed.

2. The apparatus of claim 1, wherein the plurality of lanes comprises 16 lanes.

3. The apparatus of claim 1, wherein the physical layer is to send the ordered set after 340 data blocks.

4. The apparatus of claim 1, wherein the physical layer is to send the ordered set comprising a SKP ordered set.

5. The apparatus of claim 1, wherein the physical layer is to send the ordered set comprising a control SKP ordered set.

6. The apparatus of claim 1, wherein the physical layer is to send the plurality of flits having a 528-bit flit width.

7. The apparatus of claim 1, wherein the first interconnect protocol comprises a Peripheral Component Interconnect Express protocol and the second interconnect protocol comprises a memory protocol.

8. The apparatus of claim 1, wherein the physical layer is to send an electrical idle ordered set when a data stream is to be exited.

9. A method comprising:
   receiving, in a common physical layer (PHY) of an integrated circuit, from a multi-protocol multiplexer coupled to the common PHY, information of at least one of a first interconnect protocol or a second interconnect protocol;
   sending the information in a packet, from the common PHY, to a destination component via a link, the packet comprising a protocol ID and payload information comprising a plurality of flits, wherein sending the information comprises:
      sending the protocol ID in 8-bit chunks on two consecutive lanes of the plurality of lanes, prior to each of the plurality of flits;
      sending the plurality of flits on the plurality of lanes; and
      sending an ordered set after a predetermined number of data blocks, during a mode in which sync headers are suppressed.

10. The method of claim 9, further comprising sending the ordered set after 340 data blocks.

11. The method of claim 9, further comprising sending the ordered set comprising a SKP ordered set.

12. The method of claim 9, further comprising sending the ordered set comprising a control SKP ordered set.

13. The method of claim 9, further comprising sending the plurality of flits having a 528-bit flit width.

14. The method of claim 9, further comprising sending an electrical idle ordered set when a data stream is to be exited.

15. A system comprising:
   a central processing unit (CPU) having:
      at least one core; and
      a physical layer to receive first information of a first interconnect protocol and output a packet on a plurality of lanes of a link, the packet comprising a protocol ID and payload information comprising a plurality of flits,
   wherein the physical layer is to:
      send the protocol ID in 8-bit chunks on two consecutive lanes of the plurality of lanes, prior to each of the plurality of flits;
      send the plurality of flits on the plurality of lanes; and
      send an ordered set after a predetermined number of data blocks, during a mode in which sync headers are suppressed;
   a retimer coupled to the CPU via the link; and
   an accelerator coupled to the retimer.

16. The system of claim 15, wherein the plurality of lanes comprises 16 lanes.

17. The system of claim 15, wherein the physical layer is to send the ordered set after 340 data blocks.

18. The system of claim 15, wherein the physical layer is to send the ordered set comprising a SKP ordered set.

19. The system of claim 15, wherein the physical layer is to send the ordered set comprising a control SKP ordered set.

20. The system of claim 15, wherein the physical layer is to send the plurality of flits having a 528-bit flit width.

* * * * *